United States Patent [19]
Flain et al.

[11] 4,094,551
[45] June 13, 1978

[54] MATERIAL CONVEYING SYSTEMS

[75] Inventors: Robert James Flain, Stevenage; Roy Farley, Hitchin, both of England

[73] Assignee: National Research Development Corporation, London, England

[21] Appl. No.: 692,050

[22] Filed: Jun. 2, 1976

[30] Foreign Application Priority Data
Jun. 4, 1975 United Kingdom ............... 24124/75

[51] Int. Cl.² ............................................. B65G 53/04
[52] U.S. Cl. ...................................... 302/26; 222/61; 302/41
[58] Field of Search ...................... 302/21, 24, 26, 41, 302/42, 50, 25; 222/52, 61, 64; 209/111.5, 73

[56] References Cited
U.S. PATENT DOCUMENTS

| | | | |
|---|---|---|---|
| 2,756,111 | 7/1956 | Rich | 302/26 |
| 2,861,683 | 11/1958 | Gilman | 209/111.5 |
| 3,377,107 | 4/1968 | Hodgson et al. | 302/50 X |
| 3,380,780 | 4/1968 | Allen et al. | 302/26 |
| 3,561,552 | 2/1971 | Rischke | 222/56 X |
| 3,853,355 | 12/1974 | Buissou | 302/24 X |

Primary Examiner—Stanley H. Tollberg
Assistant Examiner—Joseph J. Rolla
Attorney, Agent, or Firm—Cushman, Darby & Cushman

[57] ABSTRACT

A conveyor system including a duct and a pneumatic chopper operable to divide the material into plugs and thereby facilitate its travel along the duct. The length of the plugs is predetermined by having the chopper under the control of a detector device located downstream of the chopper.

7 Claims, 6 Drawing Figures

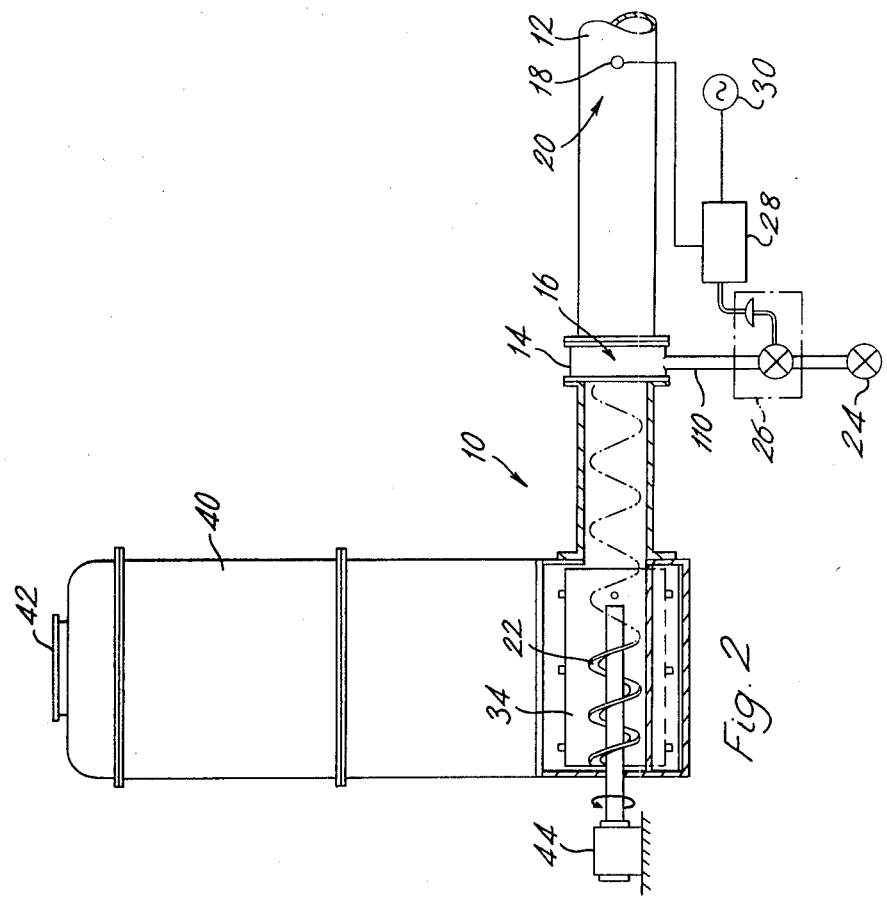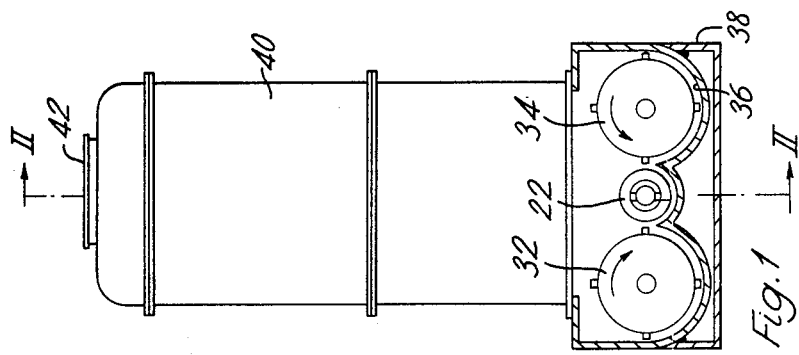

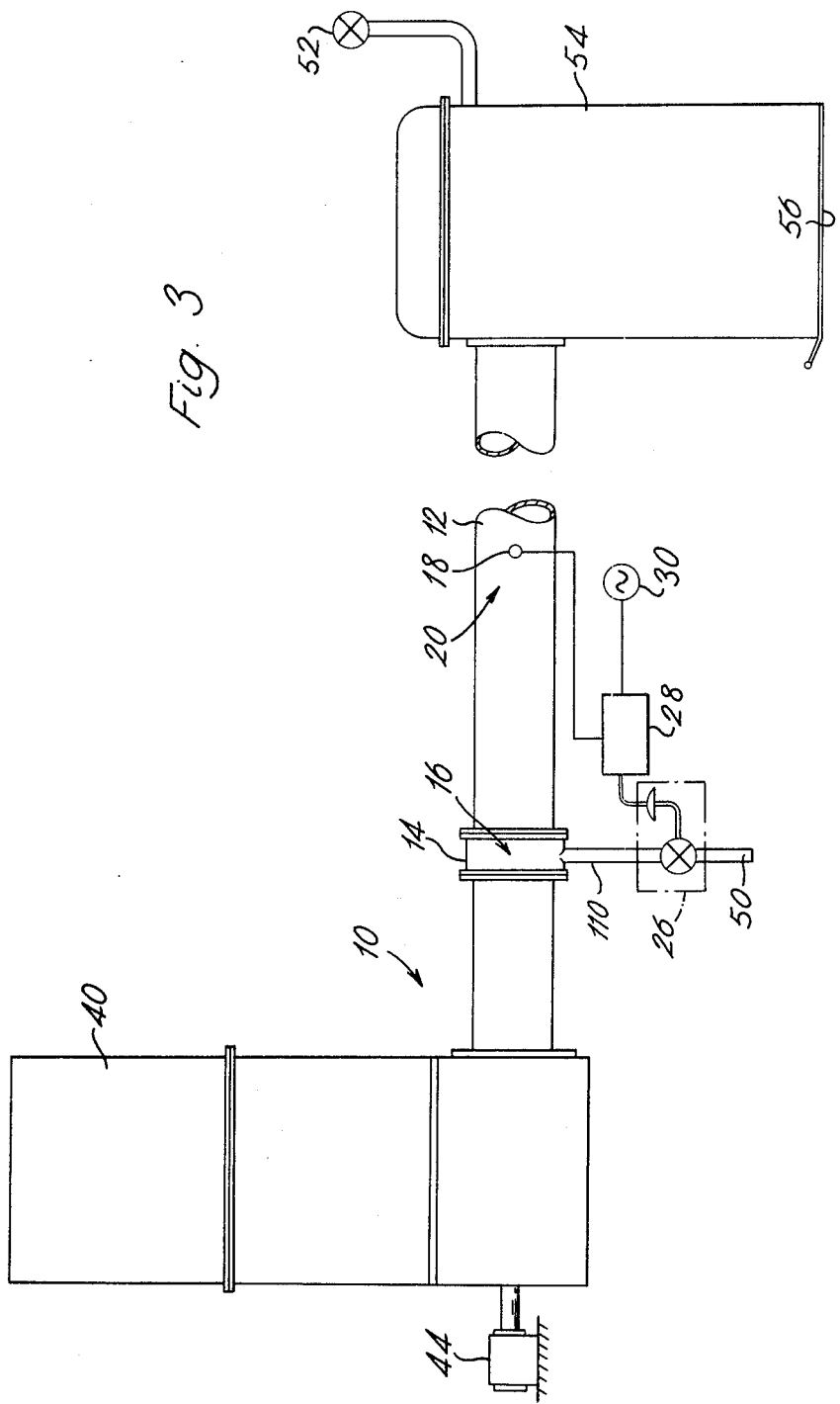

MATERIAL CONVEYING SYSTEMS

The present invention relates to conveyor systems and in particular, but not exclusively, to conveyor systems for waste or refuse, especially domestic refuse, and other materials of a similar consistency including wet materials e.g. wet peat.

Conveyor systems for domestic refuse are already known in which waste is pneumatically conveyed along a pipe to a discharge point. The waste may be conveyed in its natural form in large diameter pipes (e.g. diameters of 500 mm. or so) or it may be pulverised and conveyed in aerated form in smaller diameter pipes (typically 150 mm. or so). In both cases large volumes of air at high air velocities (e.g. 80 – 100 feet/second) are needed to carry the refuse along the pipe.

According to the present invention, a conveyor system for materials comprises a duct along which the material is to be conveyed, a separating means for separating material in the duct downstream of the separating means from material in the duct upstream of the separating means, and a detector device located downstream of the separating means and controlling the operation of the separating means.

Conveniently the separating means is actuated and maintained in operation when the detector device indicates the presence of material in the duct, for example actuation of the separating means may be controlled by a timer unit itself under the control of the detector device.

In one such embodiment, activation of the detector device is maintained at the end of each timer unit period for a further such period until there is no longer material in that part of the duct surveyed by the detector device whereupon at the end of the timer unit period currently in force, the separating means is automatically deactivated.

The separating means may be a pneumatic chopper operative to inject air into the duct at a pressure significantly above atmospheric pressure, e.g. one pound per square inch. Alternatively, if the duct is evacuated, the separating means may be a pneumatic chopper operative to inject into the duct air at or above atmospheric pressure.

The detector device may be of any conventional type e.g. photoelectric, capacitance, radioactive etc.

The invention also includes a conveyor system according to the present invention and incorporating feed means for feeding the material into the duct.

The invention also includes a conveyor assembly comprising two conveyor systems each in accordance with the present invention. The two systems are connected in series so that in operation, the first delivers material into a receptacle from which it is removed by the second. When the first system uses an evacuated duct, the second uses one at atmospheric pressure but the positions of the two systems may be interchanged if desired.

The principal advantage of the present invention over previous pneumatically operated systems is the saving in power requirements resulting from the dividing up of the material by the separating means into separated "plugs" of material. Pneumatic "chopping", as it is often termed, is not in itself new but previous pneumatic "choppers" have been devices which automatically "chop" at preselected time intervals. Such devices rely on a constant flow rate of material for their successful operation and they would with many materials be quite inadequate unless special steps were taken to ensure that the material enters the system at a constant flow rate. Domestic refuse in particular tends to have a very variable flow rate as a result of the very different constituents making up the refuse. Indeed even if a conventional time-operated chopper were designed to operate at such a speed as never to permit a slug length above a permitted maximum, then the chopper would be operating too fast for slugs to be formed at slower refuse flow rates. If on the other hand the chopper were operated so as always to allow time for a slug to be formed, then at fast refuse flow rates the slugs would be too long to allow them easily to be pushed along the conveyor pipe pneumatically.

One embodiment of the present invention is diagrammatically illustrated, by way of example, in FIGS. 1 and 2 of the accompanying drawing which show an end view and a vertical section of a conveyor system according to the invention.

FIG. 3 shows a side view of an alternative embodiment.

Figure 4:
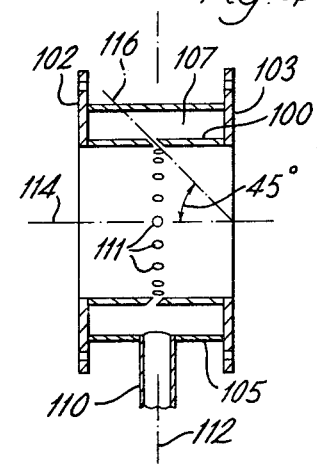
FIGS. 4 and 5 show on an enlarged scale, vertical sections of two pneumatic choppers for use in the embodiments of FIGS. 1 to 3.

Referring first to FIGS. 1 and 2, a conveyor system 10 for domestic refuse comprises an 8 inch diameter pipe 12, a pneumatic chopper 14 at a first location (16) in pipe 12, a photoelectric detector device 18 at a second (downstream) location (20) in pipe 12, and a 6 inch diameter ribbon bladed screw device 22 for moving refuse into the pipe.

The chopper 14 is fed from an air supply 24 via a solenoid control valve 26. One form of chopper is illustrated in FIG. 4 which shows a cross-section of the chopper. The chopper comprises an inner tubular portion 100 having annular end plates 102, 103 which cooperate with an outer tubular portion 105 to define an annular chamber 107. In addition, the end plates 102, 103 are apertured as indicated to allow the chopper to be bolted to the end flanges of adjacent sections of pipe 12. Reference numeral 110 indicates an inlet pipe to chamber 107 and numeral 111 indicates a ring of $20\frac{3}{8}$ inch diameter holes equally spaced around the medial plane 112 of portion 100. The internal diameter of this portion is eight inches.

It will be observed that each hole is slanted so as to have its axis inclined at 45° to the axis 114 of the chopper in a sense such as to intersect that axis at a point downstream of the plane 112. The axis (116) of one of the holes has been indicated in the Figure as an example.

Figure 5:
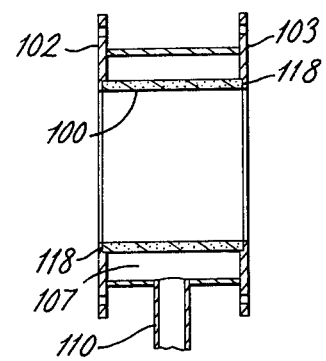

In the alternative design of chopper shown in FIG. 5, the inner portion 100 is porous and is let into an annular recess 118 in the inner corners of end plates 102, 103 as shown. A suitable material for portion 100 would be sintered bronze for example. Obviously in this case there is no need for the holes 111 of the FIG. 4 embodiment.

As will be clear from FIG. 2, the valve 26 is itself controlled by signals fed to it via a timer unit 28 from the detector device 18. Reference numeral 30 indicates a conventional electric main supply for the timer unit.

Returning now to the input end of system 10, it will be seen that the screw device 22 is fed by two studded feed drums 32, 34. These co-operate with an appropriately shaped guide surface 36 of a housing 38 at the bottom of a sealed pressure-resistant waste storage hopper 40. At its upper end, the hopper has an opening top 42.

In operation, and assuming the hopper 40 already to contain pulverised waste, the feed drums 32, 34 and the screw device 22 are rotated by an external drive 44 in the directions indicated in FIG. 1.

Screw 22 drives the waste (not shown in the Figures) along pipe 12. As soon as it reaches the detector device 18, this latter passes a signal to unit 28 to open the previously shut valve 26 as will be hereinafter described in more detail with reference to FIG. 6. This in turn allows air to pass from the air supply 24 to the chopper 14 which injects a blast of air across the interior of the pipe to separate waste material downstream of the chopper from waste material upstream of the chopper. Typically with the 8 inches diameter pipe 12 of a hundred foot or so in length, the pressure of the air would be about 1 pound per square inch. Air continues to flow from chopper 14 for a preselected variable period e.g. 2 seconds, set by unit 28, to transport the plug some distance along pipe 12.

It will be appreciated that when material is being driven up to detector device 18 for the second time, it will cause the previous plug of material to be passed further along the pipe, the air used to drive this plug past the detector now providing a pneumatic cushion between this plug and the following one. Thus in normal use, the waste is passed along, and eventually ejected from the pipe 12, as a series of plugs each of a predetermined length roughly equal to the separation (e.g. about 2½ feet) of the detector device 18 and the pneumatic chopper 14.

If for any reason the trailing end of a plug of waste formed by the chopper has not been conveyed by the air past the device 18 at the end of the timed period, then unit 28 will automatically open valve 26 for a further period or periods until the plug has passed device 18. When the plug has passed, valve 26 automatically shuts itself at the end of the timer period currently in force. It remains shut until screw 22 has again driven the waste up to device 18 whereupon the sequence described is repeated, until the hopper has been emptied.

In a typical case (assuming a refuse bulk density of 10 pounds per cubic foot), the apparatus shown in the drawing would have a capacity of about 10 tons of waste per hour. The velocities required in the illustrated apparatus are about 10 feet per second as compared with 80 – 100 feet per second with the previously available pneumatic conveyors discussed above.

A vacuum version of the system is shown in FIG. 3 where the same reference numerals have been used as in FIGS. 1 and 2 when substantially identical items are being referred to. In the system of FIG. 3, however, the system pipework 12 is put under vacuum by a vacuum pump 52 evacuating the inside of a collection hopper 54. A typical vacuum for this purpose would be between ¼ and ½ atmosphere negative pressure. Valve 26 is operated as before but this time it controls the influx of atmospheric air into the system via an open-ended pipe 50. This again has the effect of providing a controlled injection of air into pipework 12 to chop the material into plugs and thereafter provide air cushions separating these plugs of material as they pass through the system. This version is especially suited for the collection of waste from multi-storey buildings and at its lower end the hopper has an openable bottom 56 through which the waste can be periodically discharged into a storage bin or recovery vehicle. In a modification, pipe 50, instead of being open ended, is once again connected to a source of positive pressure as in the first described embodiment.

Figure 6:
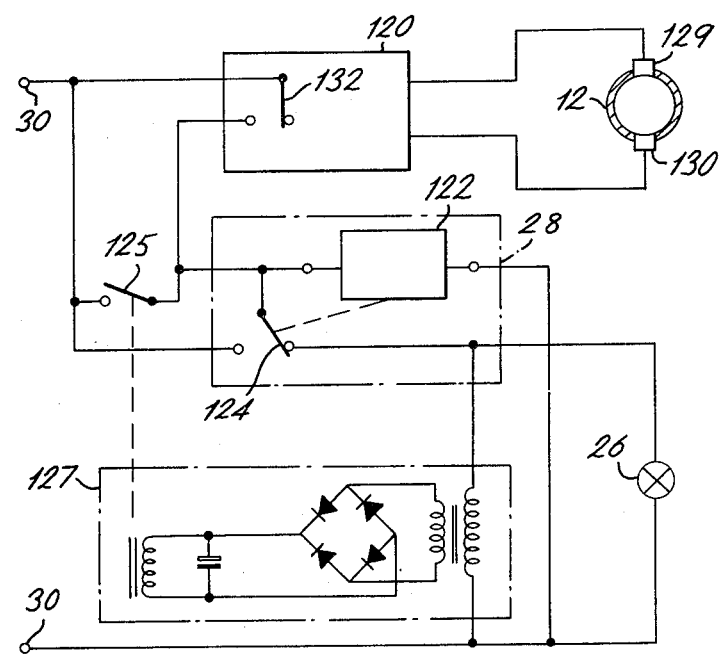
FIG. 6 shows details of the electrical system employed in these embodiments.

FIG. 6 shows the electrical system in more detail and is largely self-explanatory. The circuit includes a control box 120, delay timer 122, two switches 124, 125 (shown in their normal positions), and a transformer/relay unit 127. Reference numerals 129, 130 respectively indicate the light source and optical sensor of the photocell version of the detector 18 shown in FIGS. 1 to 3.

In the previously described operation of the system, the solenoid valve 26 is connected across the main supply 30 by the closing of the switch 132 in box 120 in response to a signal from detector 18. The energised solenoid opens the valve 26 to allow air to pass into the pipe 12 as previously described. The transformer winding of unit 127 is also energised by the closure of switch 132.

At the end of this period (which can be varied but is preset at 2 seconds in the illustrated embodiment), the timer 122 moves switch 124 to its other position to disconnect the valve solenoid from the main supply. The valve then automatically closes to shut off the air supply to pipe 12. The transformer winding in unit 127 is also disconnected in the same way but the unit holds switch 125 closed for a shorter period (0.2 seconds in the illustrated embodiment) running on from the timer's (2 second) period. At the end of this shorter period (which gives the detector device a chance to indicate whether or not material is still present in that part of the duct scanned by the device), if switch 132 is open the whole electrical system will close down and revert to the situation illustrated in FIG. 6. However if the detector 18 is still passing a signal to the control box 120, then switch 132 will be closed and the above described operation repeats until the slug of material in pipe 12 has been pushed clear of the detector 18.

Although FIG. 6 is only intended to indicate the basic constituents of the electrical system, it may be of interest to note that in the embodiment illustrated, unit 120 took the form of an Integrated Photomatrix digital control box type CU 15, the delay timer 122 took the form of a Tempatron unit type TCT 5SRP1SLp 240V AC, the condensor in unit 127 had a 50 microfarad capacitance, and the mains terminal nearer the control box 120 was the live lead of the mains.

Although the illustrated versions have been described in use with a pulverised material, obviously they can be used with an unpulverised material if this occurs in a suitable particulate form.

In a further embodiment, not separately illustrated, the apparatus shown in FIG. 3 feeds material into that shown in FIGS. 1 and 2, the hopper 40 of the pressurised version (FIGS. 1 and 2) then being replaced by the hopper 54 of the vacuum version (FIG. 3). Thus for example the suction version could be used to transfer domestic refuse from a housing estate to a local collection hopper and this latter would then be periodically emptied by the pressursied version to convey the waste over a comparatively long distance to a waste treatment or disposal plant serving a number of such estates.

Obviously the reverse combination (pressurised version feeding into vacuum version) could be used instead if desired.

We claim:

1. A conveyor system for materials, the conveyor system comprising a duct along which the material is to be conveyed, a separating means operative for a given period of time for displacing material in the duct downstream of the separating means further downstream away from material in the duct upstream of the separating means, a detector device positioned at a specific duct location downstream of the separating means for detecting presence of material in the duct at said location to control the operation of the separating means and control means for causing further operation of said separating means for a further period when said detector device indicates the continued presence of material at the end of said given period of time.

2. A conveyor system as claimed in claim 1 in which the separating means is a pneumatic chopper operative to inject air into the duct at a pressure significantly about atmospheric pressure.

3. A conveyor system as claimed in claim 1 including means for evacuating the duct and wherein the separating means is a pneumatic chopper operative to inject into the duct air at or above atmospheric pressure.

4. A conveyor system as claimed in claim 1 in which the detector device comprises a photoelectric device.

5. A conveyor system as claimed in claim 1 and incorporating feed means for feeding the material along the duct.

6. A conveyor system as claimed in claim 1 in which actuation of the separating means is controlled by a timer unit itself under the control of the detector device.

7. A conveyor system as claimed in claim 6 in which activation of the separating means is maintained at the end of each timer unit period for a further such period until there is no longer material in that part of the duct surveyed by the detector device whereupon at the end of the timer unit period currently in force, the separating means is automatically deactivated.

* * * * *